United States Patent
Grady

(10) Patent No.: US 6,252,363 B1
(45) Date of Patent: Jun. 26, 2001

(54) CIRCUIT FOR TIMED POSITION CONTROL OF DEVICE DRIVEN BY A DC MOTOR

(75) Inventor: Mark Emerson Grady, Port Huron, MI (US)

(73) Assignee: Prestolite Wire Corporation, Port Huron, MI (US)

( * ) Notice: Subject to any disclaimer, the term of this patent is extended or adjusted under 35 U.S.C. 154(b) by 0 days.

(21) Appl. No.: 09/322,587

(22) Filed: May 28, 1999

Related U.S. Application Data

(60) Provisional application No. 60/087,463, filed on Jun. 1, 1998.

(51) Int. Cl.$^7$ ....................................................... H02P 1/22
(52) U.S. Cl. ........................ 318/266; 318/244; 318/245; 318/264; 318/265; 318/266; 318/283; 318/284; 318/285; 318/286; 318/293
(58) Field of Search ..................................... 318/244, 245, 318/264, 265, 266, 283–286, 466–469, 293

(56) References Cited

U.S. PATENT DOCUMENTS

| | | | |
|---|---|---|---|
| 4,576,662 | * | 3/1986 | Lehnhoff .............................. 318/282 |
| 4,798,967 | * | 1/1989 | Yamana et al. . |
| 4,857,813 | * | 8/1989 | Matsumoto et al. ................... 318/54 |
| 4,940,903 | * | 7/1990 | Brown, Jr. et al. .................. 307/122 |
| 5,089,715 | * | 2/1992 | Kokubu ............................... 307/10.1 |
| 5,097,188 | * | 3/1992 | Nakase et al. ....................... 318/466 |
| 5,126,885 | * | 6/1992 | Gray .................................... 359/841 |
| 5,128,597 | * | 7/1992 | Kokubu ............................... 318/286 |
| 5,130,627 | * | 7/1992 | Frommholz ......................... 318/652 |
| 5,406,179 | * | 4/1995 | Davall et al. ........................ 318/286 |
| 5,703,732 | | 12/1997 | Boddy et al. . |
| 5,706,144 | * | 1/1998 | Brandin ............................... 359/843 |
| 5,731,675 | * | 3/1998 | McCarthy ............................ 318/469 |
| 5,977,732 | * | 11/1999 | Matsumoto ......................... 318/283 |

FOREIGN PATENT DOCUMENTS 0 294 791 A2    12/1988 (EP) .

\* cited by examiner

Primary Examiner—Robert E. Nappi
Assistant Examiner—Tyrone Smith
(74) Attorney, Agent, or Firm—Rader, Fishman & Grauer PLLC

(57) ABSTRACT

The present invention relates to an electronic circuit that interrupts the application of electrical power to a motor after a predetermined period of time. The electronic circuit is disposed between a motor which drives a device from an initial position to a final position and a switch movable from a first position to a second position. A battery which supplies the electrical power for the motor is engaged with the switch. The control circuit includes at least two energy storage devices. Depending on the position of the switch, one of the energy storage devices will be fully charged by the battery source. Altering the position of the switch will cause the fully charged energy storage device to begin its discharge and the alternate energy storage device will be "instantly" charged. During the time that both energy storage devices have a significant charge on them, a control signal is generated. The control signal will be present until the discharging energy storage device falls below a threshold value. In response to the control signal, the electrical power source is applied to the motor and the motor will turn in the direction according to the polarity of the applied power source. In a second embodiment of the invention, electrical power to the motor may be interrupted prior to a full discharge of the energy storage device if the current drawn by the motor exceeds a predetermined threshold value for a minimal time period.

25 Claims, 3 Drawing Sheets

CIRCUIT FOR TIMED POSITION CONTROL OF DEVICE DRIVEN BY A DC MOTOR

This application claims the benefit of U.S. Provisional Application No. 60/087,463 filed on Jun. 1, 1998.

TECHNICAL FIELD OF THE INVENTION

The present invention relates to an electronic circuit that interrupts the application of electrical power to a motor after certain conditions have been met. In particular, the present invention interrupts the application of electrical power to the motor after a predetermined period of time has elapsed. In a second embodiment of the invention, the application of power is interrupted after a predetermined current threshold has been met for some predetermined minimal time.

BACKGROUND OF THE INVENTION

Various assemblies have been devised to run an electrical motor for a predetermined period of time, to move a device from a first position to a second position. These assemblies are also devised to allow the motor to run in the opposite direction, to move the device from the second position back to the first position.

Assemblies of this type are used to control many different devices that run on a DC motor and require bi-directional movement. These assemblies can be used to control the initial and final positions of various electric devices, such as those used in medical equipment, automation production and motor vehicles. Examples of uses of these assemblies in automobiles include, for example, control circuitry for sideview mirrors, convertible tops and retractable head lights.

Movement of the devices between the initial and final positions is usually effected by a small electric motor that drives a gear mechanism. When used in automobiles, these motors are usually sub-fractional horsepower DC motors that operate from the 12-volt vehicle power system. Applying the voltage in one polarity causes the motor mechanism to operate in one mode of the initial/final position and reversing the polarity effects the alternate mode.

For many devices in the automobile industry, designers prefer to provide a single snap-action two-state switch for the vehicle operator to select the device deployment mode. The switch is a snap-action switch that retains the selected setting after the operator removes his or her finger. The switches are usually a dual-pole, double throw (DPDT) type that are cross wired to provide the 12-volts in either polarity orientation to the DC motor, and thus alternate the operating direction of the motors. Other switches that provide alternating polarity to the circuit could also be used, including mechanical switches of the sliding or push button variety, appropriately configured contacts of electric relays, and rotary switches with appropriate contact geometry.

What is required for these powering topologies is an intervening circuit between the switch and the DC motor to remove power to the motor after a sufficient time has passed to allow the initial/final position function to be completed. Without this intervening circuit, voltage would be applied to the DC motor continuously, even after the mechanism had completed implementing the selected deployment mode. The continual application of voltage to the stalled motor would be unacceptable, due to resulting damage to the motor and depletion of battery energy. The continuous application of voltage to a stalled motor significantly increases the current drawn by the motor, causing the motor to become overheated and possibly damaged. Moreover, when used in an automobile, application of voltage to a motor at all times, even when the automobile is parked, will result in draining the battery.

Various assemblies have been devised to cut off electrical power to a motor after it has driven a device for a predetermined period. U.S. Pat. No. 5,703,732 to Boddy et al. refers to an electrical control system for a mirror unit that uses an RC timer circuit. The timer is comprised of two resistors, two diodes and a single capacitor. The capacitor and one of the resistors form an RC circuit causing a gradual rise in voltage. This rising voltage eventually turns off a transistor, which turns off a relay, which turns off the motor. U.S. Pat. No. 4,524,312 to Matsumoto refers to a control system that uses a single capacitor, a driver transistor and a power transistor. Power is supplied to the DC motor when the power transistor becomes conductive. Power is shut off after the capacitor is gradually charged up so as to render the driver transistor conductive. In response to the conduction of the driver transistor, the power transistor becomes nonconductive, to shut off power to the motor.

Other known control circuits require mechanical movement for controlling the motor. U.S. Pat. No. 5,315,442 to Sato et al. refers to a control system for an electrically powered foldable mirror that includes a mechanical stop device and a sensor for detecting a halt to motor rotation. A control circuit means interrupts the motor drive circuit when the sensor detects the halt of the motor rotation. U.S. Pat. No. 4,657,362 to Suzuki also refers to a control system for an electrically foldable mirror. When the mirror visor reaches the closed position, a movable contact member comes into contact with a terminal causing a capacitor to discharge and turning off transistors. Thus, the motor is de-energized, causing the motor to stop.

U.S. Pat. No. 4,403,178 to Kaminski refers to two different circuit strategies for the bi-directional control of a DC motor for gear shifting on a truck. The circuit disclosed in FIG. 2 uses a complicated user-operated mechanical switch to connect and disconnect one capacitor at a time to activate one of two sides of an H-bridge transistor power switch. While one capacitor is connected via the switch to turn on its side of the H-bridge, the other capacitor is removed from its side of the H-bridge and allowed to recharge. The circuit disclosed in FIG. 4 uses two timing capacitors and resistors for controlling the length of time that the motor is activated in either direction. The mechanical switch is used to alternately apply the same polarity of voltage to one capacitor-resistor combination or the other. Each of the United States patents cited hereinabove is hereby incorporated by reference into the present specification.

Disadvantages of known control circuits include the use of expensive and bulky solid state electronic elements.

Another disadvantage of known control circuits is their reliance on moving mechanical parts. As often occurs in devices with moving parts, these circuits are susceptible to malfunctioning.

Another disadvantage of known control circuits includes the drawing of significant current when the control circuit is not powering the motor. Control circuits that require continuously forward biasing a driver transistor will draw significant current which can drain the battery.

Another disadvantage of known control circuits includes the inability to easily provide alternate activation times for the motor for each operating direction of the motor mechanism.

SUMMARY OF THE INVENTION

The present invention is directed to an electronic circuit that interrupts the application of electrical power to a motor after a predetermined period of time. The electronic circuit is disposed between a switch and a motor which is engageable with a movable device. After activating the switch, the electronic circuit powers the motor for a first predetermined period of time, driving the device from a first position to a second position. After activating the switch a second time, the electronic circuit powers the motor in the opposite direction for a second predetermined period of time, to drive the device from the second position back to the first position.

The switch is movable between a first position and a second position. Moving the switch from one position to another alters the polarity of the applied voltage to the control circuit and the motor. The control circuit includes at least first and second energy storage devices. Depending on whether the switch is in the first position or the second position, either the first energy storage device or the second energy storage device will be fully charged by the battery source. In a preferred embodiment of this invention, a network of diodes automatically charges up one of the energy storage devices at a time, depending upon the position of the switch.

Altering the position of the switch will cause the fully charged energy storage device to begin its discharge and the alternate energy storage device will be "instantly" charged. In a preferred embodiment, the energy storage devices are capacitors and a timing resistor is added in parallel to each of the capacitors. Immediately after the switch makes a transition, both capacitors will be fully charged, but one of the capacitors will decline in voltage according to its respective RC time constant. Thus, alternate activation times for each operating direction of the motor mechanism can be provided by selecting appropriate values for the respective RC time constants. The difference in operating time would be useful to reduce wear and tear on the mechanism and power consumption if the mechanism really did not require the identical operating time for each operating mode.

During the time that both energy storage devices have a significant charge on them, a control signal is generated. The control signal will be present until the discharging energy storage device falls below a threshold value. In a preferred embodiment, the control signal is generated by turning on two transistors at the same time. In effect, a logical AND function is effected by this circuit topology. The gates of the two transistors are driven by the voltage across the two energy storage devices. Thus, when both the energy storage devices have a significant charge on them, both transistors will be turned on.

In response to the control signal, the power source is applied to the motor and the motor will turn in the direction according to the polarity of the applied power source. The motor can be engaged with a gear mechanism to drive a device, such as a foldable side-view mirror housing for a motor vehicle, such as an automobile. While the control signal is present, the mirror housing will move from an initial position to a final position. The mirror housing will stop upon termination of the control signal. In a preferred embodiment, the control signal drives a relay. While the control signal is present, the relay will be activated, allowing the motor mechanism to complete its transition. Termination of the control signal effectively opens the coil drive circuit for the relay, shutting off the relay and removing electrical power to the motor.

The above-described embodiment of the invention alone will be satisfactory for many applications. However, some applications require the motor to operate for varying lengths of time to complete its function of moving from its first position to its second position or vice versa. By way of example only, an automated screw or nut fastener that is capable of accommodating variable thread lengths would require its motor to operate for variable lengths of time, depending upon the length of the thread. In these situations, the described invention would be designed so that the applicable RC time constant would be long enough so that the motor would always be powered for the longest time that would ever be required to complete its function. Accordingly, in those instances where the motor completed its function in less than the maximum time allotted by the applicable RC time constant, power would continue to be applied to the motor for a period of time even though the motor had completed its function and had attained a mechanically stalled condition. But this is undesirable because of the potential damage to the motor resulting from the continued application of electrical power to the stalled motor.

To address this problem, a second preferred embodiment of the invention includes the addition of motor stall detection circuits to monitor the electrical current that flows through the motor. When the motor stalls and the electrical current passing through it increases significantly, the stall detection circuits discharge the residual charge of the capacitor that is controlling the timing function for the particular direction that the motor is operating. Then, the motor is shut down as described above. The second preferred embodiment of the invention includes all of the features and elements of the first embodiment. The second preferred embodiment differs from the first only in the addition of the stall detection circuits.

DETAILED DESCRIPTION OF THE INVENTION

Figure 1:
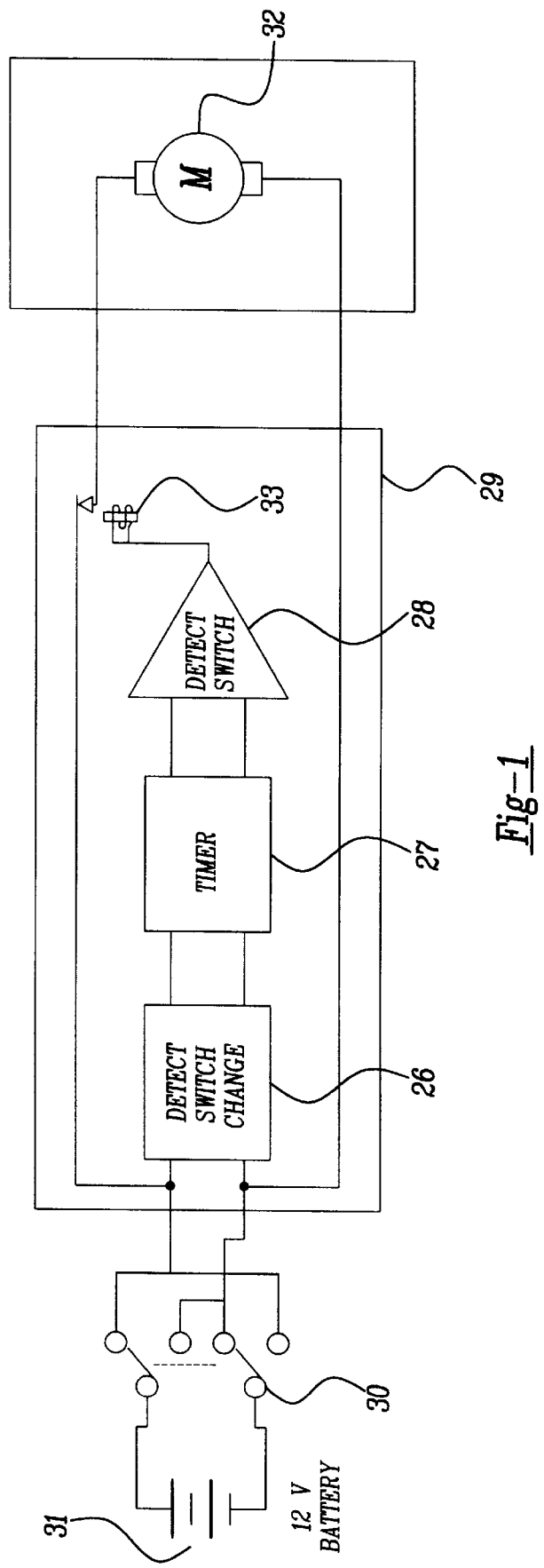
FIG. 1 shows a blocked diagram of the control circuit according to a preferred embodiment of the present invention.

With reference to FIG. 1, the control circuit 29 according to a preferred embodiment of the invention comprises means for detecting switch change 26, timer means 27, a relay driver 28 and a relay 33. The means for detecting switch change 26 is connected to a cross-wired switch 30 which in turn is connected to a battery 31. In this embodiment, it is assumed that battery 31 supplies 12-volts DC of energy. Relay 33 activates a motor 32 which can be used to control a device (not shown) movable between a first position and a second position.

Figure 2:
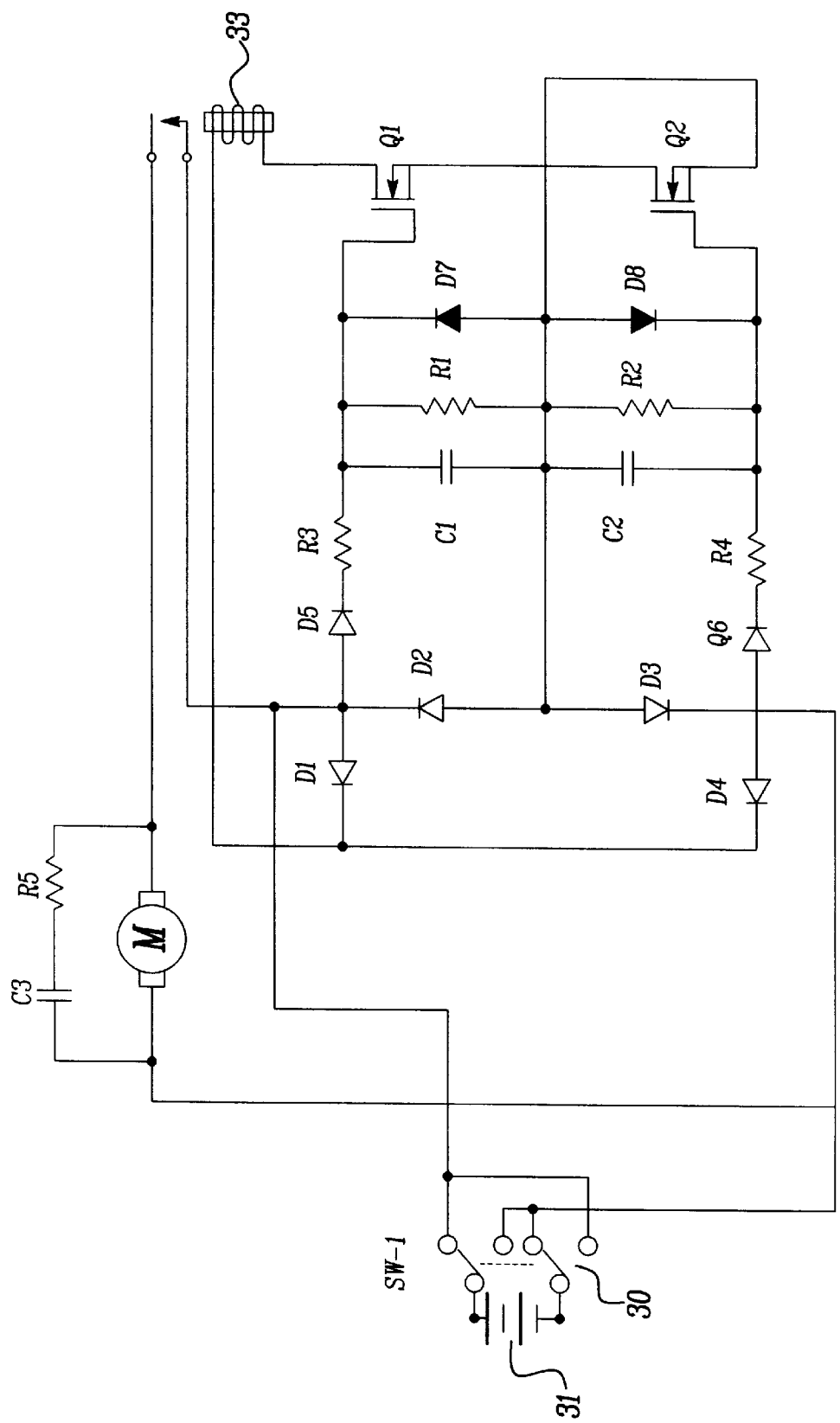
FIG. 2 shows a schematic of the circuit according to a first preferred embodiment of the present invention.

Referring to FIG. 2, which shows circuit 29 in detail, switch 30 supplies the power source from battery 31 to circuit 29. Battery 31 supplies electrical power to motor 32 through relay 33. Altering the state of switch 30 only reverses the polarity of the 12-volts to the circuit 29 and motor 32. The control circuit 29 detects this transition and activates relay 33 for a length of time (seconds) sufficient to allow the motor mechanism to complete the transition from one position to the other.

Circuit 29 includes Capacitors C1 and C2 and resistors R1 and R2. R2 is connected in parallel to C2, and R1 is connected in parallel to C1. For either setting of switch 31, diodes D2 and D3 establish a common ground 25 for the junction of C1 and C2, and for the junction of R1 and R2, and for the source terminal of MOSFET Q2. Diodes D5 and D6 permit current to flow from the battery 31 to the R1/C1 and the R2/C2 combinations, respectively. Zener diodes D7 and D8 are connected in parallel with C1 and C2, respectively, effectively clamping the maximum voltage that is permitted to accumulate across C1 and C2.

For either setting of switch 30, either C1 or C2 will be charged to their respective maximum voltages. The maximum voltage across either C1 or C2 will be the lesser of (i) the voltage of battery 31; and (ii) the maximum voltage permitted across zener diodes D7 or D8, respectively. Altering the setting of the switch will cause the fully charged capacitor to begin its discharge and the other capacitor to assume its maximum voltage. Capacitor C1 will discharge at a rate determined by its value and the value of R1. C2 will discharge at a rate determined by its value and the value of R2. Normally, the RC time constant of either RC combination will be several seconds. Immediately after switch 30 makes a transition, both C1 and C2 are charged substantially to their maximum voltages. However, one of them begins a decline in voltage according to its respective RC time constant.

The gates of MOSFET Q1 and MOSFET Q2 are driven by the voltage across C1 and C2 respectively. Q1's drain is connected to relay 33, and Q1's source is connected to Q2's drain. Q2's source is connected to the common ground 25. When C1 and C2 are simultaneously charged to near their maximum voltages, both Q1 and Q2 are turned on and effectively ground the low side of relay 33. Diodes D1 and D4 provide the complementary positive 12-volts to the high side of relay 33, depending upon the applied polarity of battery 31. Thus, under the conditions of both C1 and C2 being charged to their maximum voltages, relay 33 is activated. Relay 33 stays activated until the discharging capacitor supplies less than a few volts to the gate of its associated MOSFET. When the voltage across one of the capacitors diminishes below a few volts, its associative MOSFET shuts off and effectively opens the coil drive circuit for relay 33. The relay shuts off and removes electrical power from motor 32. When relay 33 is activated, the battery voltage of either polarity is applied to motor 32 and the motor will turn in the direction according to the polarity of the applied voltage.

R3 and R4 form a low pass network with C1 and C2 respectively. These low pass filters prevent high amplitude electrical spikes from momentarily turning on either MOSFET Q1 or MOSFET Q2. The low pass filters also act to dampen the amplitude of high voltage spikes that might otherwise damage the sensitive gates of the MOSFET transistors. The high voltage spikes can easily be generated when relay 33 opens and removes power from motor 32. The inductive characteristics of motor 32 and the relatively high current through the motor, due to it being mechanically stalled, will produce a large inductive flyback voltage pulse.

Inherent with this circuit, is the feature of easily providing alternate activation time for motor 32 for each operating direction of the motor mechanism. This is effected by selecting components for R1 and C1 and for R2 and C2 such that the RC time constant for R1/C1 is different than the time constant for R2/C2.

Capacitor C3 and resistor R5 are connected in series with each other, and together in parallel with motor 32. C3 and R5 are used to absorb the high voltage spike and current spike that are generated by motor 32 when power is first applied and removed to the motor. These spikes would normally cause a damaging arc to occur each time the relay contacts open and close. C3 and R5 allow the use of relatively small and less expensive relays without concern for premature failure due to contact arcing.

Zener diodes D7 and D8 provide additional protection to the gates of Q1 and Q2 by clamping any applied voltage to the gates at a safe level. Zener diodes D7 and D8 also clamp the maximum voltage to which C1 and C2 can be charged, regardless of the applied battery voltage. This arrangement permits the applied battery voltage to vary without affecting the time required to discharge C1 or C2 and thus the length of time that power is supplied to motor 32.

Figure 3:
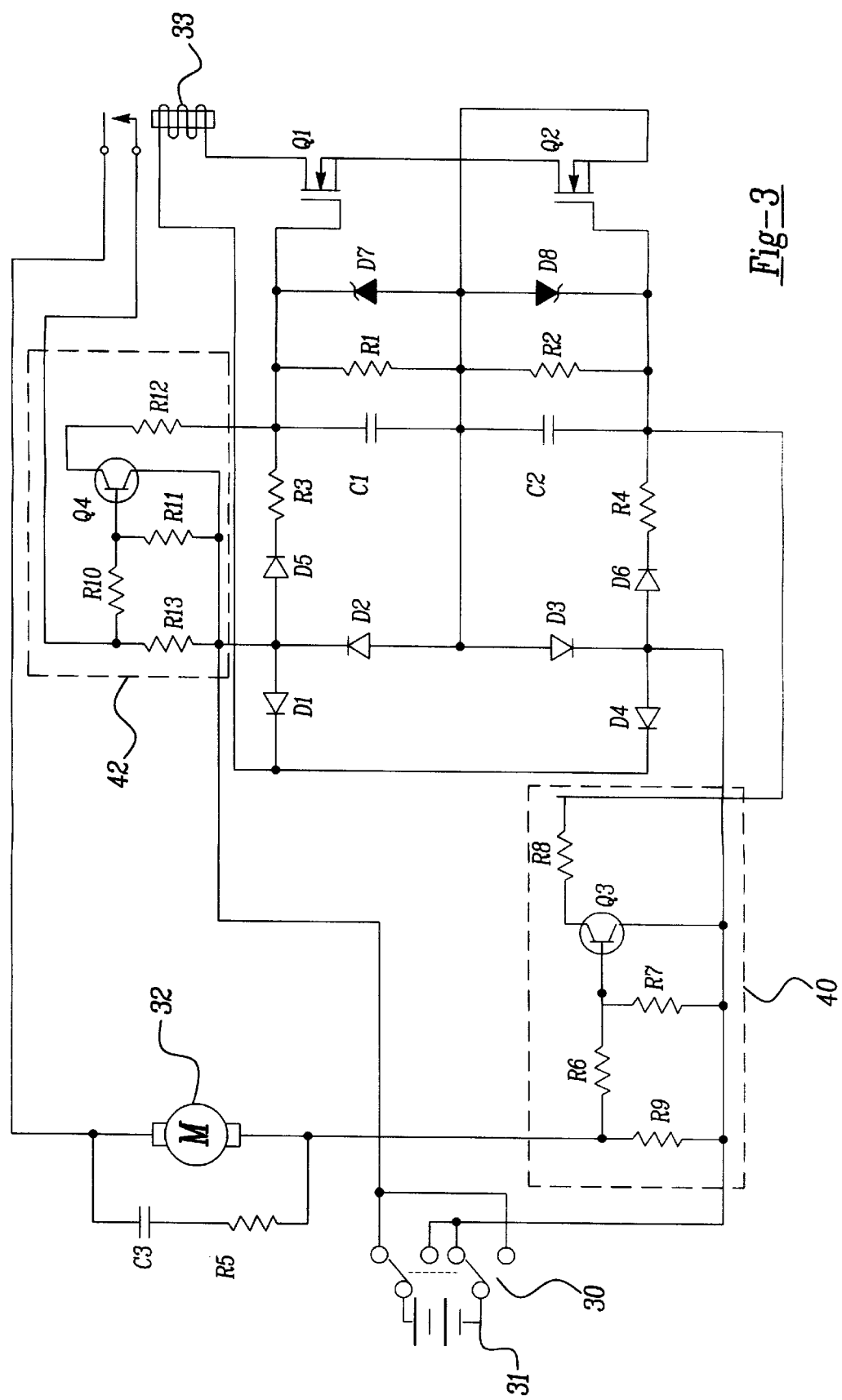
FIG. 3 shows a schematic of the circuit according to a second preferred embodiment of the present invention.

FIG. 3 shows a second preferred embodiment of the invention, which includes all of the features and components described with respect to the embodiment of the invention shown in FIG. 2, as well as the additional stall detection circuits 40, 42. The stall detection circuits 40, 42 are included to provide for situations where a varying amount of time is required for the motor 32 to complete its function, as described hereinabove.

Stall detection circuit 40 includes transistor Q3 and resistors R6, R7, R8, and R9. Stall detection circuit 42 includes transistor Q4, and resistors R10, R11, R12, and R13. Stall detection circuit 40 operates when the operation of motor 32 is being controlled by the R2/C2 combination. Stall detection circuit 42 operates when the operation of motor 32 is being controlled by the R1/C1 combination.

Resistor R9 is disposed between the motor 32 and switch 30. When motor 32 is being controlled by the R2/C2 combination, a voltage is dropped across R9 due to current being supplied to the motor. The voltage drop is of the proper polarity to forward bias Q3. R6 and R7 form a voltage divider across R9, and it is the voltage drop across R7 that biases the base of Q3. When the polarity of the applied voltage is reversed by switch 30, the polarity of the voltage drop across R9 and R7 is reversed, and Q3 is reverse biased, thus making stall detection circuit 40 inactive.

The value of R9 is preferably small so that it does not significantly affect the operation of the motor 32. The value of R9 should be chosen so that when the motor 32 is not mechanically stalled, the voltage drop across R9 is insufficient to forward bias Q3 through the bias resistors R6 and R7. The R6/R7 voltage divider reduces the voltage drop from R9 to the base of Q3 to ensure that Q3 does not become forward biased when the motor 32 is not mechanically stalled.

When the motor 32 does mechanically stall, the voltage drop across R9 increases significantly due to the significant stall current associated with the stalled motor. The voltage drop across R7 rises accordingly. This heightened voltage drop across R7 is then sufficient to forward bias Q3 into its conductive state. This permits the residual charge in C2 to immediately discharge through R8 and Q3 to common ground 25, and for motor 32 to shut off as described above in connection with the first embodiment of the invention.

The level of current required to be drawn by motor 32 in order to activate Q3 is determined by the values set for the current sense resistor R9 and bias resistors R6 and R7. Furthermore, the shutdown delay time is determined by the RC time constant derived from the values of R8 and C2.

For the applied polarity of battery 31 as described above, the timing for the operation of motor 32 is determined by the length of time that it takes C2 to discharge through R2. When motor 32 stalls, Q3 is forward biased and the collector of Q3, which is grounded, places the relatively low value of R8 across C2. This causes C2 to rapidly discharge, and thus "time out" the timing circuit and shut off the motor 32 as described previously in connection with the embodiment of the invention shown in FIG. 2.

The value of R8 is chosen to prevent the instantaneous discharge of C2 by Q3. R8 forms an RC time constant discharge circuit with C2 and thus discharges C2 over some period of time once Q3 becomes conductive. The discharge time is determined by the RC time constant for the combination of R8 and C2. This delay in discharging C2 prevents a momentary excessive current spike through the motor from causing the instantaneous discharge of C2 and shutting down motor 32. Momentary high current spikes through the motor 32 may occur due to initial motor startup and momentary mechanical binding in the mechanism that the motor might be driving.

When the applied voltage is reversed by switch 30 so that the operation of motor 32 is being controlled by the R1/C1 combination, stall detector circuit 40 becomes inactive and stall detector circuit 42 becomes active instead. Stall detector circuit 42 operates in the same fashion as stall detector circuit 40. Resistor R/13 is connected between motor 32 and battery 31 through relay 33. R10 and R11 form a voltage divider across R13, and the voltage drop across R11 biases Q4. When the operation of motor 32 is being controlled by the R1/C1 combination and motor 32 stalls, the significant increase in current drawn by motor 32 increases the voltage drop across R13 and R11 sufficiently to forward bias Q4. Then, C1 is permitted to discharge relatively quickly through R12 and Q4. The amount of time required to discharge is determined by the values of R12 and C1.

Those of skill in the art will appreciate that the present invention can be used to control many different types of devices that run on a DC motor and require bi-directional movement. For example, the present invention can be used to control the initial and final positions of various devices used in medical equipment that requires bi-directional position control, such as universal x-ray systems, orthopedic therapy systems, and specialized surgery equipment systems. The present invention can be used in automated production situations, such as for product positioning on an assembly line, positioning of a manufacturing operation tool, and control of a robot arm. The present invention can also be used in automobiles to control foldable side-view mirrors, foldable convertible tops, retractable headlights, electrical locks for doors, automatic antennas, etc.

In an embodiment of the present invention used to control the position of a foldable side-view mirror of a motor vehicle, the side-view mirror has a housing that is foldably mounted on the vehicle for movement between a folded position and an extended position. A reversible electric motor is fixedly accommodated or carried in the mirror housing. A switch movable between at least a first position and a second position is provided within the vehicle for selecting either the folded or extended position of the mirror. Upon movement of the switch to one of its positions, a control circuit activates the reversible motor for a predetermined period, to drive the mirror either from the folded position to the extended position or from the extended position to the folded position.

While I have hereinbefore described a number of embodiments of this invention, it is apparent that the basic constructions can be altered to provide other embodiments which utilize the processes and compositions of this invention. Therefore, it will be appreciated that the scope of this invention is to be defined by the claims appended hereto rather than by the specific embodiments which have been presented hereinbefore by way of example.

What is claimed is:

1. A control circuit responsive to a switch movable between a first position and a second position for applying an electrical power source to an electric motor which drives a device from an initial position to a final position, said control circuit comprising:

a first energy storage device for accumulating an electrical charge when said switch is in said first position;

at least a second energy storage device for accumulating an electrical charge when said switch is in said second position;

means for generating a first activation signal while said switch is in said first position and for a predetermined period when said switch is in said second position;

means for generating a second activation signal for a predetermined period when said switch is in said first position and while said switch is in said second position;

means responsive to said first activation signal and said second activation signal for generating a control signal; and means responsive to said control signal for connecting the electrical power source to the electric motor for driving the device from the initial position to the final position.

2. The control circuit of claim 1, wherein said means for generating a control signal comprises a first transistor having a gate and a second transistor having a gate, and wherein the gate of said first transistor is driven by the voltage across said first energy storage device and the gate of said second transistor is driven by the voltage across said second energy storage device.

3. The control circuit of claim 2, wherein a first resistor forms a first low pass filter with said first energy storage device to prevent high amplitude electrical spikes from momentarily turning on said first transistor and a second resistor forms a second low pass filter with said second energy storage device to prevent high amplitude electrical spikes from momentarily turning on said second transistor.

4. The control circuit of claim 1, wherein a network of diodes automatically charge up one of said first energy storage device and said second energy storage device depending upon the position of said switch.

5. The control circuit of claim 1, wherein said first energy storage device is a first capacitor and said second energy storage device is a second capacitor.

6. The control circuit of claim 5, wherein said means for generating first and second activation signals comprise a first timing resistor in parallel with said first capacitor, forming a first RC combination, and a second timing resistor in parallel with said second capacitor, forming a second RC combination, and wherein the predetermined period for generating said first activation signal when said switch is in said second position is determined by said first RC combination and the predetermined period for generating said second activation signal when said switch is in said first position is determined by said second RC combination.

7. The control circuit of claim 1, wherein said means for connecting the electrical power source to the electric motor includes a relay.

8. The control circuit of claim 1, wherein said switch is a dual-pole, double throw switch.

9. The control circuit of claim 1, wherein a third energy storage device is connected in series with a resistor, and said third energy device and said resistor are connected in parallel with the motor.

10. The control circuit of claim 1, wherein said device is a foldable side-view mirror housing of a motor vehicle.

11. The control circuit of claim 1, further comprising a means for detecting a stalled motor condition; and a means for discharging at least one of said energy storage devices in response to said detecting means.

12. The control circuit of claim 11, wherein said detecting means comprises a transistor having a base wherein said base is driven by the voltage drop across a resistor.

13. The control circuit of claim 11, where said discharging means comprises a resistor connected to said energy storage device.

14. A control circuit disposed between an electric motor which drives a device from an initial position to a final position and a switch movable from a first position to a second position and engaged with an electrical power source, said control circuit comprising:

a first energy storage device for accumulating an electrical charge when said switch is in said first position;

at least a second energy storage device for accumulating an electrical charge when said switch is in said second position;

a network of diodes which automatically charge up one of said first energy storage device and said second energy storage device, depending upon the position of said switch;

a first transistor having a gate, wherein said gate turns on said first transistor when said switch is in said first position and for a predetermined period when said switch is in said second position;

a second transistor having a gate, wherein said gate turns on said second transistor when said switch is in said second position and for a predetermined period when said switch is in said first position; and means responsive to said first transistor and said second transistor for applying the electrical power source to the electric motor.

15. The control circuit of claim 14, wherein the gate of said first transistor is driven by the voltage across said first energy storage device and the gate of said second transistor is driven by the voltage across said second energy storage device.

16. The control circuit of claim 14, wherein a first resistor forms a first low pass filter with said first energy storage device to prevent high amplitude electrical spikes from momentarily turning on said first transistor and a second resistor forms a second low pass filter with said second energy storage device to prevent high amplitude electrical spikes from momentarily turning on said second transistor.

17. The control circuit of claim 14, wherein said first energy storage device is a first capacitor and said second energy storage device is a second capacitor.

18. The control circuit of claim 17, wherein a first timing resistor is in parallel with said first capacitor, forming a first RC combination, and a second timing resistor is in parallel with said second capacitor, forming a second RC combination, and wherein the predetermined period for turning on said first transistor when said switch is in said second position will be determined by said first RC combination and the predetermined period for turning on said second transistor when said switch is in said first position will be determined by said second RC combination.

19. The control circuit of claim 14, wherein said means for connecting the electrical power source to the electric motor includes a relay.

20. The control circuit of claim 14, wherein said switch is a dual-pole, double throw switch.

21. The control circuit of claim 14, wherein a third energy storage device is connected in series with a resistor, and said third energy device and said resistor are connected in parallel with the motor.

22. The control circuit of claim 14, wherein said device is a foldable side-view mirror housing of a motor vehicle.

23. The control circuit of claim 14, further comprising a means for detecting a stalled motor condition; and a means for discharging at least one of said energy storage devices in response to said detecting means.

24. A system for controlling a position of a foldable side-view mirror on a motor vehicle comprising:

a side-view mirror foldably mounted on the vehicle for movement between a folded position and an extended position;

a reversible electric motor operatively connected to said side-view mirror for operating said side-view mirror between said folded position and said extended position;

a switch movable between a first position and a second position and engaged with an electrical power source;

a control circuit disposed between said reversible electric motor and said switch, said control circuit comprising:

a first energy storage device for accumulating an electrical charge when said switch is in said first position;

a second energy storage device for accumulating an electrical charge when said switch is in said second position;

means for generating a first activation signal while said switch is in said first position and for a predetermined period when said switch is in said second position;

means for generating a second activation signal for a predetermined period when said switch is in said first position and while said switch is in said second position;

means responsive to said first activation signal and said second activation signal for generating a control signal; and means responsive to said control signal for connecting the electric power source to the reversible electric motor for driving the side-view mirror from said folded position to said extended position.

25. The system in claim 24, further comprising a means for detecting a stalled motor condition; and means for discharging at least one of said energy storage devices in response to said detecting means.

* * * * *

UNITED STATES PATENT AND TRADEMARK OFFICE
CERTIFICATE OF CORRECTION

PATENT NO.     : 6,252,363 B1
DATED          : June 26, 2001
INVENTOR(S)    : Mark Emerson Grandy It is certified that error appears in the above-identified patent and that said Letters Patent is hereby corrected as shown below:

<u>Title page,</u>
Item [12], "Grady" should read -- Grandy --; and
Item [75], Inventor, replace "Grady" with -- Grandy --

Signed and Sealed this

Second Day of September, 2003

JAMES E. ROGAN
*Director of the United States Patent and Trademark Office*